United States Patent [19]

Blattel et al.

[11] 4,341,645

[45] Jul. 27, 1982

[54] AQUEOUS DRILLING AND PACKER FLUIDS

[75] Inventors: Steven R. Blattel; Larry W. Hilscher, both of Houston, Tex.

[73] Assignee: NL Industries, Inc., New York, N.Y.

[21] Appl. No.: 225,671

[22] Filed: Jan. 16, 1981

[51] Int. Cl.³ ............................................. C09K 7/02
[52] U.S. Cl. .............................. 252/8.5 C; 252/8.55 R
[58] Field of Search .............. 252/85 A, 8.5 C, 8.55 R

[56] References Cited

U.S. PATENT DOCUMENTS

| | | | |
|---|---|---|---|
| 2,552,775 | 5/1951 | Fischer et al. | 252/8.5 |
| 2,718,497 | 9/1955 | Oldham et al. | 252/8.5 |
| 2,935,504 | 5/1960 | King et al. | 252/8.5 X |
| 3,284,352 | 11/1966 | Burdyn et al. | 252/8.5 |
| 3,730,900 | 5/1973 | Perricone et al. | 252/8.5 |
| 4,220,585 | 9/1980 | Javora et al. | 252/8.5 X |
| 4,268,400 | 5/1981 | Lucas et al. | 252/8.5 |

*Primary Examiner*—Herbert B. Guynn

[57] ABSTRACT

Aqueous, clay-containing drilling fluids and packer fluids are modified for reduction of viscosity and gel strength upon addition of water soluble lignosulfonates and particular low molecular weight acrylic copolymers. Enhanced reduction of viscosity and gel strength may be obtained by also adding an ethoxylated phenol surfactant.

13 Claims, No Drawings

AQUEOUS DRILLING AND PACKER FLUIDS

The need for developing geothermal sources of energy and the trend towards deeper drilling for oil and gas has created a need for water base drilling fluids which are stable at temperatures in excess of 400° F. Geothermal wells have been drilled into formations with temperatures in excess of 700° F. Presently used drilling fluids are not capable of maintaining their characteristics at such temperatures. Only by the systematic replacement of degraded drilling fluid additives can presently formulated drilling fluids be used at temperatures of 400° F. and above.

One of the major problems which develops in the drilling of high temperature is the maintenance of low rheological properties of high density clay-containing, water base, muds. Commonly used mud thinners, deflocculants, such as the lignosulfonates lose their effectiveness resulting in increased rheological properties.

In order to economically extract energy from geothermal areas, it is necessary to provide drilling fluids which can function satisfactorily above 400° F. It is an object of this invention to provide additives for clay-containing, water base drilling fluids which prevent or retards the gelation of the drilling fluid at temperatures in excess of 400° F.

It is another object of this invention to provide drilling fluid compositions for use at temperatures in excess of 400° F.

We have now found that the addition of a water soluble lignosulfonate salt and a particular low molecular weight acrylic copolymer synergistically reduce the viscosity and gelation of clay-containing, water base drilling fluids at temperatures in excess of 400° F. We have also found that an even enhanced synergistic viscosity reduction is obtained upon the additional addition of an ethoxylated phenol surfactant.

The lignosulfonate salts which are effective in this invention are the water soluble lignosulfonates commonly used in drilling fluids which contain a cation selected from the group consisting of iron, chromium, aluminum, copper, zirconium, titanium and mixtures thereof. See for example the following U.S. patents which are incorporated herein by reference for all purposes: King et al. U.S. Pat. No. 2,935,504 and Javora et al. U.S. Pat. No. 4,220,585.

The acrylic copolymer which is effective in this invention is a water soluble salt of a copolymer of acrylic acid and hydroxypropyl acrylate which has a molecular weight in the range from about 5,000 to about 10,000 and which has a mole ratio of acrylic acid to hydroxypropyl acrylate in the range from about 2.5 to about 1.75. Preferably the molecular weight is in the range from about 6,000 to about 9,000, and the mole ratio of acrylic acid salt to hydroxypropyl acrylate is about 2, i.e., in a range from about 1.9 to about 2.1. Thus the acrylic copolymer has the following structure:

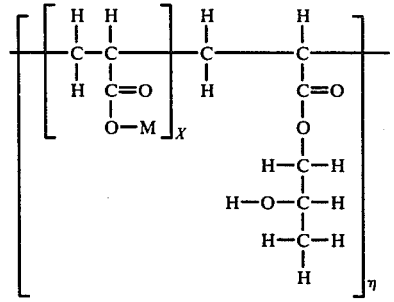

Where $\eta$ is the degree of polymerization to produce the desired molecular weight, x represents the mole ratio of acrylic acid salt to hydroxypropyl acrylate in the polymer, and M represents the water solubilizing salt forming cation. Preferably M is an alkali metal or ammonium cation, and is most preferably sodium. At a mole ratio of 2 the preferred copolymer has the following structure:

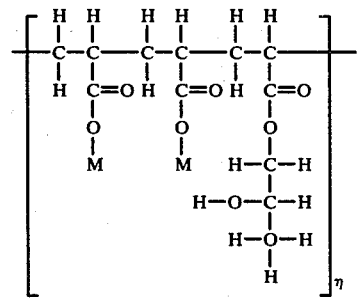

Where $16 \leq \eta \leq 32$.

The acrylic copolymer can be made by known techniques such as emulsion, suspension, bulk or solution polymerization techniques. Preferably the copolymer is prepared by a suspension or solution polymerization process in which a chain terminating agent is added after the desired degree of polymerization has been obtained.

The surfactant useful in this invention is a water soluble, nonionic compound characterized by the formula

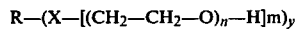

wherein R is a hydrophobic group containing at least six carbon atoms, X is a structural element selected from the group consisting of —O—, —S—,

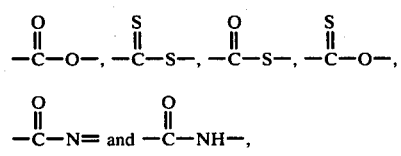

$(CH_2-CH_2-O)$ is ethylene oxide, n is a whole number, H is hydrogen, M is a whole number one less than the valence of the structural element X, y is a whole number, and the product of n, m, and y is at least as great as ten such as from 10 to 50. When m is 2, n may be equal or unequal for each of the $(CH_2-CH_2-O)_n$—H groups. It is preferred to employ a compound wherein y has a value of one. The latter compounds may be represented by the formula R—X—[(CH$_2$—CH$_2$—O)$_n$—H]$_m$ Preferably there is employed a compound wherein y and m have a value of one and n has a value in the range 20-40, preferably 25-35. These compounds may be represented by the formula R—X—(CH$_2$—CH$_2$—O)nH Where $20 \leq n \leq 40$, preferably $25 \leq n \leq 35$.

Most preferably there is employed phenol adducted with from 25 to 35 moles of ethylene oxide.

See for example Burdyn et al. U.S. Pat. No. 3,284,352, incorporated herein by reference.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of this disclosure. Accordingly, modifications are contemplated which can be made without departing from the spirit of the described invention.

The drilling fluid compositions for use at elevated temperatures must contain a clay dispersed in the aqueous phase. Generally bentonite clays of the Wyoming type will be used. These are predominantly sodium bentonites which have high dispersion properties in aqueous system and develop high viscosity and gel strength values, and low fluid loss values. Other clays which may be present in the drilling muds are other smectite clays, such as calcium bentonite, illites, kaolins, mixed-layer clays, and mixtures thereof.

When a drilling fluid containing a brine aqueous phase is desired, it is preferred that the bentonite be prehydrated in fresh water before addition to the brine. This is conveniently accomplished using the process and apparatus disclosed in Pippen U.S. Pat. No. 3,691,070, incorporated herein by reference.

In general, the drilling fluid compositions of this invention will contain from about 5 to about 36 ppb. of sodium bentonite clay, from about 1 to about 10 ppb. of the lignosulfonate, from about 0.5 to about 5 ppb. of the acrylic copolymer, and from 0 to about 6 ppb. of the surfactant. Preferably, the drilling fluids will contain from about 10 to about 20 ppb. of sodium bentonite, from about 3 to about 7 ppb. of the lignosulfonate, from about 1 to about 4 ppb. of the acrylic copolymer, and from about 1 to about 4 ppb. of the surfactant.

If clays other than sodium bentonite are present in the drilling fluids, they generally will be present in amounts from about 5 to about 100 ppb.

The following examples will further illustrate the novel characteristics of the additives, composition and process of our invention. In these examples, all data were obtained utilizing the American Petroleum Institute's procedure RP 13B unless otherwise indicated. The ferro-chrome lignosulfonate utilized in these examples was Q-BROXIN ® which is commercially available from NL Baroid, NL Industries, Inc. It contained 3% Fe and 1% Cr.

The acrylic polymer utilized is a copolymer of sodium acrylate and hydroxypropyl acrylate in a 2:1 mole ratio having an average molecular weight of about 7500. It was utilized as a 50% active aqueous solution.

The surfactant utilized in these examples is an ethoxylated phenol in which each molecule of phenol is adducted with 29 molecules of ethylene oxide. It was utilized as a 60% active solution which also contained 3% of a defoamer. This is commercially available from NL Baroid as AKTAFLO-S. ®

The Wyoming bentonite used was a premium grade sold as AQUAGEL ® by NL Baroid.

All percentages used herein are by weight unless otherwise noted.

EXAMPLE 1

A base drilling fluid was prepared containing 25 ppb. (pounds per 42 gallon barrel) of Wyoming bentonite, 50 ppb. of Glen Rose shale and 1 ppb. caustic soda. To this base mud were added the amounts of ferro-chrome lignosulfonate and acrylic polymer indicated in Table 1. These muds were placed in a Fann 50 B Viscometer set at 100 rpm and the temperature controls were adjusted to give staged 400° F., 450° F. and 500° F. temperatures at one hour intervals while maintaining the pressure at 800 psi. The data obtained are given in Table 1.

The data indicated that the lignosulfonate and the acrylic polymer synergistically interacted to decrease the viscosity of the drilling fluid at temperatures of 400° F. and above.

TABLE 1

Effect of Ferro-Chrome Lignosulfonate and an Acrylic Polymer on the Viscosity of a Bentonite Mud at Elevated Temperatures.

| ppb. FCL[1] | ppb. AP[2] | Temp. °F. | Time hr.[3] | Viscosity cp. |
|---|---|---|---|---|
| 5 | 0 | 72 | 0 | 19 |
| 0 | 1.5 | 72 | 0 | 41 |
| 5 | 1.5 | 72 | 0 | 24 |
| 5 | 0 | 200 | 0.15 | 9 |
| 0 | 1.5 | 200 | 0.15 | 35 |
| 5 | 1.5 | 200 | 0.15 | 13 |
| 5 | 0 | 300 | 0.25 | 10 |
| 0 | 1.5 | 300 | 0.25 | 30 |
| 5 | 1.5 | 300 | 0.25 | 10 |
| 5 | 0 | 400 | 1 | 26 |
| 0 | 1.5 | 400 | 1 | 196 |
| 5 | 1.5 | 400 | 1 | 28 |
| 5 | 0 | 400 | 2 | 65 |
| 0 | 1.5 | 400 | 2 | 237 |
| 5 | 1.5 | 400 | 2 | 38 |
| 5 | 0 | 450 | 3 | 105 |
| 0 | 1.5 | 450 | 3 | 100 |
| 5 | 1.5 | 450 | 3 | 36 |
| 5 | 0 | 500 | 4 | 162 |
| 0 | 1.5 | 500 | 4 | 111 |
| 5 | 1.5 | 500 | 4 | 34 |
| 5 | 0 | 500 | 5 | 175 |
| 0 | 1.5 | 500 | 5 | 104 |
| 5 | 1.5 | 500 | 5 | 31 |

[1]Ferro-Chrome lignosulfonate
[2]Acrylic copolymer. 100% active basis
[3]Total elapsed heating time

EXAMPLE 2

A base drilling fluid was prepared containing 0.68 bbl. of water, 15 lb. of Wyoming bentonite, 15 lb. of Glen Rose shale, and 286 lb. of barite (BAROID). To this mud was added either: (a) 10 ppb. North Dakota lignite (Leonardite) and 3 ppb. caustic soda; (b) 5 ppb. North Dakota lignite and 2 ppb. caustic soda; or (c) 1 ppb. NaOH as indicated in Table 2. To these muds were added the amounts of ferro-chrome lignosulfonate, acrylic polymer and surfactant indicated in Table 2. Various characteristics of these muds were evaluated after rolling for 16 hours at 150° F. and after aging for 16 hours at 400° F. as indicated in Table 2.

The data obtained indicate that the acrylic polymer and the surfactant synergistically interacted to decrease the shear strength, interparticle rheological values, or fluid loss of these clay/lignosulfonate muds.

from about 1 to about 10 ppb. of a water soluble lignosulfonate which contains a cation selected from the group consisting of iron, chromium, aluminum, copper, zirconium, titanium, and mixtures thereof; and from about 0.5 to about 5 ppb of a copolymer of acrylic acid and hydroxypropyl acrylate having an average molecu-

TABLE 2

|  | $A_1^{(3)}$ | $B_1^{(3)}$ | $C_1^{(3)}$ | $D_1$ | $A_2^{(4)}$ | $B_2^{(4)}$ | $C_2^{(4)}$ | $D_2^{(4)}$ | $A_3^{(5)}$ | $B_3^{(5)}$ | $C_3^{(5)}$ | $D_3^{(5)}$ |
|---|---|---|---|---|---|---|---|---|---|---|---|---|
| FCL, ppb.[1] | 5 | 5 | 5 | 5 | 5 | 5 | 5 | 5 | 5 | 5 | 5 | 5 |
| AP, ppb.[2] | 0 | 1.5 | 1.5 | 0 | 0 | 1.5 | 1.5 | 0 | 0 | 1.5 | 1.5 | 0 |
| Surfactant, ppb. | 0 | 0 | 3 | 3 | 0 | 0 | 3 | 4 | 0 | 0 | 3 | 4 |
| *After Rolling at 150° F. 16 hours, cooling to R. T. and Mixing* | | | | | | | | | | | | |
| Plastic Viscosity, cp. | 67 | 56 | 39 | 42 | 51 | 37 | 44 | 50 | 53 | 37 | 43 | 42 |
| Yield Point, lb./100 sq. ft. | 16 | 11 | 9 | 13 | 9 | 9 | 10 | 15 | 4 | 4 | 4 | 0 |
| Gel Strengths, lb./100 sq. ft. | 6/11 | 6/10 | ⅜ | 5/9 | 3/7 | 5/7 | 5/7 | 2/4 | 2/3 | 3/3 | ⅜ | 0/1 |
| pH | 11.0 | 10.7 | 11.4 | 11.3 | 11.2 | 11.1 | 10.8 | 10.7 | 10.0 | 10.7 | 10.2 | 10.2 |
| *After Aging at 400° F. for 16 hours and cooling to R. T.* | | | | | | | | | | | | |
| Shear Strength, lb./100 sq. ft. | 2020 | 766 | 89 | 120 | 592 | 81 | 80 | 474 | 1140 | 108 | 120 | 1467 |
| *After Mixing 5 Minutes* | | | | | | | | | | | | |
| Plastic Viscosity, cp. | 82 | * | 33 | 38 | 85 | 51 | 51 | 74 | * | 55 | 65 | * |
| Yield Point, lb./100 sq. ft. | 161 | * | 112 | 115 | 47 | 35 | 14 | 18 | * | 11 | 10 | * |
| Gel Strengths, lb./100 sq. ft. | 54/172 | * | 48/115 | 50/126 | 8/88 | 22/64 | 4/30 | 5/88 | * | ⅜ | 2/2 | * |
| HPHT Filtrate, ml. @ 500 psi/400° F. | — | — | — | — | 45 | 27 | 24 | 47 | * | 86 | 65 | * |

[1] Ferro-chrome lignosulfonate
[2] Acrylic copolymer, 100% active basis
[3] These muds contained 10 ppb. CARBONOX® lignite and 3 ppb. NaOH
[4] These muds contained 5 ppb. CARBONOX® lignite and 2 ppb. NaOH
[5] These muds contained 1 ppb. NaOH
*Too great to measure

EXAMPLE 3

A clay/lignosulfonate field mud was obtained from a well which had been drilled to 17,440 ft. This mud contained 70% by volume water and 30% by volume of solids of which 0.5% by volume were dissolved solids. The undissolved solids, which constituted 62.7% by weight of the mud, had an average specific gravity of 4.06.

This mud was treated with the amounts of acrylic polymer and surfactant indicated in Table 3 and evaluated as in Example 2. The data obtained are given in Table 3.

Additionally, this mud was treated, for comparison, with a maleic anhydride-sulfonated polystyrene polymer of the type disclosed in Perricone et al. U.S. Pat. No. 3,730,900. The data indicate that the sodium acrylate-isopropyl acrylate copolymer of this invention substantially outperformed this copolymer in this mud.

lar weight in the range from about 5000 to about 10,000 and the following structure:

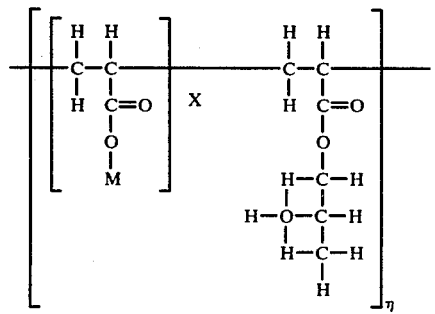

where n is the degree of polymerization to produce the molecular weight, x represents the mole ratio of acrylic

TABLE 3

|  | A | B | C | D | E |
|---|---|---|---|---|---|
| AP, ppb.[1] | 1.5 | 0 | 1.5 | 0 | 0 |
| Surfactant | 0 | 0 | 0 | 0 | 0 |
| MAP, ppb.[2] | 0 | 5 | 5 | 1.5 | 0 |
| Plastic Viscosity, cp. | 27 | 30 | 34 | 30 | 27 |
| Yield Point, lb./100 sq. ft. | 23 | 11 | 24 | 21 | 17 |
| Gel Strengths, lb./100 sq. ft. | 10/43 | 7/28 | 13/44 | 10/43 | 10/46 |
| pH | 10.0 | 10.2 | 9.9 | 9.8 | 10.3 |
| HPHT Filtrate, ml. @ 500 psi, 400° F. | 18 | 26 | 19 | 20 | 20 |
| Shear Strength, lb./100 sq. ft. | 651 | 2107 | 255 | 1644 | 1966 |
| Plastic Viscosity, cp. | 32 | 41 | 27 | 39 | 49 |
| Yield Point, lb./100 sq. ft. | 65 | 71 | 66 | 48 | 36 |
| Gel Strengths, lb./100 sq. ft. | 43/94 | 38/85 | 27/53 | 35/125 | 23/89 |
| pH | 8.6 | 9.0 | 9.0 | 9.0 | 8.7 |
| HPHT Filtrate, ml. @ 500 psi, 400° F. | 35 | 62 | 43 | 36 | 42 |

[1] Acrylic copolymer, 100% active basis.
[2] Maleic anhydride, sulfonated polystyrene copolymer.

We claim:
1. An aqueous drilling fluid comprising: an aqueous phase; a clay material suspended in the aqueous phase; acid salt to hydroxypropyl acrylate in the polymer, and M represents the salt forming cation which is selected from the group consisting of ammonium, the alkali metals, and mixtures thereof.

2. The fluid of claim 1 wherein x has a value in the range from about 1.75 to about 2.5.

3. The fluid of claim 1 wherein said clay comprises a bentonite in which the exchangeable cations are predominantly sodium.

4. The fluid of claim 1 wherein x has a value in the range from about 1.9 to about 2.1.

5. The fluid of claim 1 containing a water soluble, nonionic compound characterized by the formula $$R-(X-[(CH_2-CH_2-O)_n-H]_m)_y$$

where R is a hydrophobic group containing at least six carbon atoms, X is a structural element selected from the group consisting of —O—, —S—,

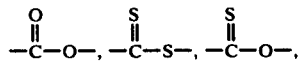

$(CH_2-CH_2-O)$ is ethylene oxide, n is a whole number, H is hydrogen, m, y is a whole number one less than the valence of the structural element x, y is a whole number, and the product of n, m and y is in the range from 10 to 50.

6. The fluid of claim 5 wherein m and y have a value of one.

7. The fluid of claim 6 wherein $20 \leq n \leq 40$.

8. The fluid of claim 7 wherein x is oxygen and R is a phenyl radical.

9. The fluid of claim 5 wherein x has a value in the range from about 1.75 to about 2.5.

10. The fluid of claim 7 wherein x has a value in the range from about 1.75 to about 2.5.

11. The fluid of claim 8 wherein x has a value in the range from about 1.75 to about 2.5.

12. The aqueous drilling fluid of claim 1, 2, 3, 4, 5, 6, 7, 8, 9, 10, or 11 wherein the lignosulfonate is ferrochrome lignosulfonate.

13. A process of drilling a subterranean well wherein there is circulated in the borehole while drilling the aqueous drilling fluid of claim 1, 2, 5, 9, 10, or 11.

* * * * *